US008482457B2

(12) United States Patent
Aizawa

(10) Patent No.: US 8,482,457 B2
(45) Date of Patent: Jul. 9, 2013

(54) RADAR APPARATUS

(75) Inventor: Ichiro Aizawa, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/501,388

(22) PCT Filed: Nov. 27, 2009

(86) PCT No.: PCT/JP2009/006444
§ 371 (c)(1),
(2), (4) Date: Apr. 11, 2012

(87) PCT Pub. No.: WO2011/064823
PCT Pub. Date: Jun. 3, 2011

(65) Prior Publication Data
US 2012/0229328 A1    Sep. 13, 2012

(51) Int. Cl.
*G01S 13/44*    (2006.01)
*G01S 13/93*    (2006.01)

(52) U.S. Cl.
USPC .......................................... 342/149; 342/70

(58) Field of Classification Search
USPC ....................................................... 342/149
See application file for complete search history.

(56) References Cited

U.S. PATENT DOCUMENTS

| 5,495,256 | A * | 2/1996 | Piper | 342/195 |
|---|---|---|---|---|
| 6,429,804 | B1 | 8/2002 | Kishida et al. | |
| 7,301,496 | B2 * | 11/2007 | Honda et al. | 342/70 |
| 7,391,383 | B2 * | 6/2008 | Schantz | 343/767 |
| 2009/0096674 | A1 | 4/2009 | Karam et al. | |

FOREIGN PATENT DOCUMENTS

| JP | A-09-318767 | 12/1997 |
|---|---|---|
| JP | A-11-287857 | 10/1999 |
| JP | A-2001-153946 | 6/2001 |
| JP | A-2001-166029 | 6/2001 |
| JP | A-2003-139849 | 5/2003 |
| JP | A-2005-148042 | 6/2005 |
| JP | A-2006-078342 | 3/2006 |
| JP | A-2006-145444 | 6/2006 |
| JP | A-2008-516213 | 5/2008 |
| JP | A-2008-151660 | 7/2008 |
| JP | A-2011-027695 | 2/2011 |

OTHER PUBLICATIONS

Davis, R.M.; Fante, R.L.; , "Maximum likelihood processing with digital beamforming," Antennas and Propagation Society International Symposium, 2000. IEEE. vol. 2, pp. 898-901.*
Dec. 22, 2009 International Search Report issued in International Patent Application No. PCT/JP2009/006444.

* cited by examiner

Primary Examiner — Matthew M Barker
(74) Attorney, Agent, or Firm — Oliff & Berridge, PLC

(57) ABSTRACT

Provided is a radar apparatus capable of accurately calculating the presence direction of an object. The radar apparatus radiates an electromagnetic wave, receives a reflected wave caused by the electromagnetic wave reflected from the object, and detects the presence direction of the object. The radar apparatus includes: an electromagnetic wave radiating section configured to radiate the electromagnetic wave; a reflected wave reception section configured to receive the reflected wave and detect information about the received reflected wave; and a reflected wave type estimation section configured to determine which the type of the received reflected wave received by the reflected wave reception section is, a single reflected wave which is just reflected from an object, or a composite reflected wave which is composed of a plurality of reflected waves, reflected from different objects, that have interfered with each other, based on the information about the received reflected wave.

8 Claims, 6 Drawing Sheets

F I G. 4
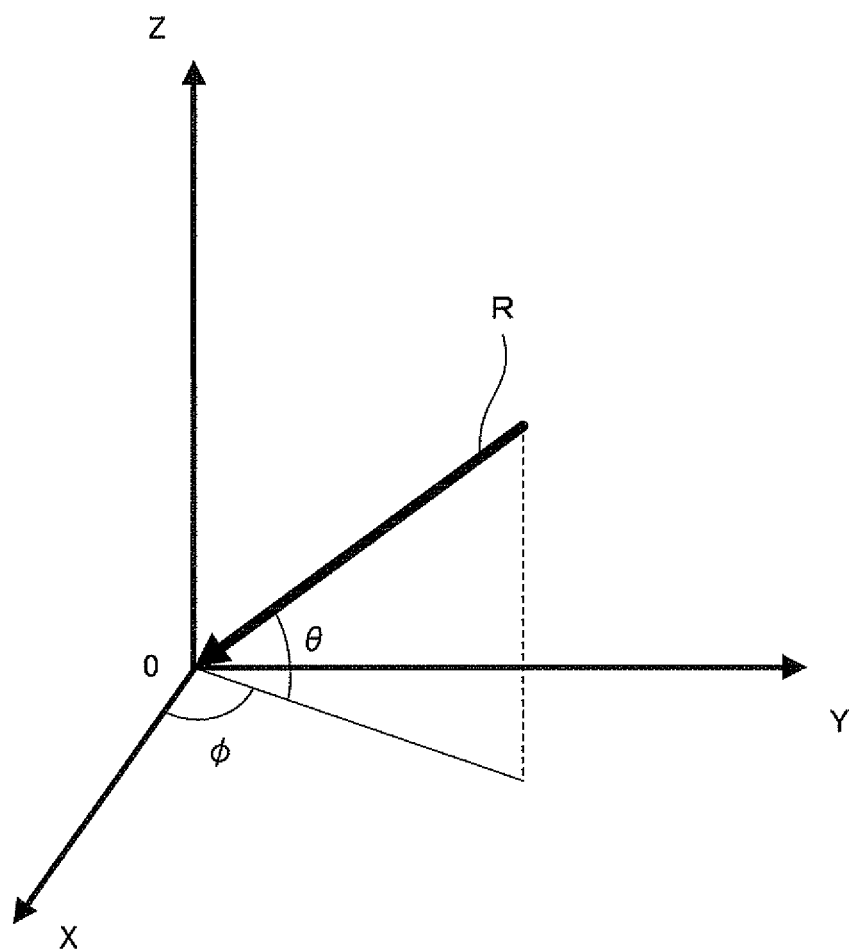

RADAR APPARATUS

TECHNICAL FIELD

The present invention relates to a radar apparatus, and more specifically, to a radar apparatus, provided in a vehicle, which detects the position of an object present around the vehicle.

BACKGROUND ART

In recent years, a radar apparatus which detects an object around a vehicle is provided in the vehicle, so as to detect another vehicle ahead of the vehicle, a walking person, or the like. Many of such radar apparatuses employ a method in which an ultrasonic wave or an electromagnetic wave is radiated to an object and the reflected wave from the object is received whereby the position of the object is detected.

For example, Patent Literature 1 discloses a radar apparatus employing a so-called phase monopulse technique which detects the position of an object, based on the phase difference between reflected waves received by a plurality of antennas. The radar apparatus of Patent Literature 1 includes: a reception antenna including array antennas composed of a plurality of device antennas arrayed in the horizontal direction; and a signal processing section which electrically scans the antenna pattern of the reception antenna in the horizontal direction, thereby recognizing an object present in a horizontal direction within a predetermined range of angles, from reception signals received by the reception antenna. In addition, in the radar apparatus, at least some of the device antennas are placed being displaced from each other in the vertical direction. The signal processing section detects, by monopulse technique, the position of an object with respect to the vertical direction by using reception signals received by the device antennas displaced from each other in the vertical direction.

CITATION LIST

Patent Literature

[PTL 1] Japanese Laid-Open Patent Publication No. 11-287857

SUMMARY OF THE INVENTION

Problems to be Solved by the Invention

However, in the case where a plurality of reflected waves from a plurality of objects are received, the radar apparatus of Patent Literature 1 might not be able to correctly detect the positions of the objects. Specifically, reflected waves that have occurred at the plurality of objects interfere with each other to cause a composite wave. If such a composite wave is received by the radar apparatus of Patent Literature 1, the radar apparatus calculates the position of an object, based on the phase information about the composite wave. In this case, the radar apparatus cannot detect an object, based on the phase information about an original reflected wave from the object that is yet to interfere with another wave. Therefore, probably the radar apparatus cannot detect the accurate position of the object.

In addition, in the case where a reflected wave just reflected from an object, and a reflected wave that is first reflected at a road and then reflected from the object, occur, such reflected waves that have passed different routes interfere with each other to cause a composite wave. Also in such a case, the radar apparatus cannot detect the accurate position of the object.

In general, a vehicle having such a radar apparatus as described above has a system for controlling the travelling of the vehicle, based on the position of an object detected by the radar apparatus. Here, if the position information about an object is not accurately detected as in the above case, unnecessary vehicle control can be executed, which causes discomfort to a driver.

The present invention has been made in consideration of the above problems. An object of the present invention is to provide a radar apparatus that is capable of detecting the type of a reflected wave that has been received.

Solution to the Problems

In order to solve the above problems, the present invention has the following aspects. The first aspect of the present invention is a radar apparatus which radiates an electromagnetic wave, receives a reflected wave caused by the electromagnetic wave reflected from an object, and detects the presence direction in which the object is present, the radar apparatus including: an electromagnetic wave radiating section configured to radiate the electromagnetic wave; a reflected wave reception section configured to receive the reflected wave and detect information about the received reflected wave; a reflected wave type estimation section configured to determine which the type of the received reflected wave received by the reflected wave reception section is, a single reflected wave which is just reflected from an object, or a composite reflected wave which is composed of a plurality of reflected waves, reflected from different objects, that have interfered with each other, based on the information about the received reflected wave; and a direction calculation section configured to calculate the presence direction of an object, based on the result of the determination by the reflected wave type estimation section.

In the second aspect based on the first aspect, the radar apparatus further includes a direction calculation section configured to change a method for calculating the presence direction of an object in accordance with the type of the received reflected wave, and calculate the presence direction of the object by the method.

In the third aspect based on the second aspect, the reflected wave reception section includes: a first antenna configured to detect at least the amplitude level of the received reflected wave as the information about the received reflected wave; and a second antenna which is separately provided at a given position on a plane including the reception surface of the first antenna, the second antenna being configured to detect at least the amplitude level of the received reflected wave as the information about the received reflected wave. The reflected wave type estimation section determines which the type of the received reflected wave is, a single reflected wave or a composite reflected wave, based on the magnitude relationship between the amplitude level of the received reflected wave detected by the first antenna, and the amplitude level of the received reflected wave detected by the second antenna.

In the fourth aspect based on the third aspect, the second antenna is placed being separated from the first antenna by a predetermined distance in the horizontal direction, on the plane including the reception surface of the first antenna.

In fifth aspect based on the third aspect, the second antenna is placed being displaced relative to the first antenna by a predetermined distance in the vertical direction, on the plane including the reception surface of the first antenna.

In the sixth aspect based on the second aspect, if it has been determined that the type of the received reflected wave is a composite reflected wave, the direction calculation section calculates the presence direction of the object, by maximum likelihood estimation.

In the seventh aspect based on the third aspect, the first antenna and the second antenna each detect the phase of the received reflected wave. If it has been determined that the type of the received reflected wave is a single reflected wave, the direction calculation section calculates the presence direction of the object, by phase monopulse technique, based on the phase of the received reflected wave detected by the first antenna, and the phase of the received reflected wave detected by the second antenna.

In the eighth aspect based on the third aspect, the reflected wave type estimation section calculates the difference value between the amplitude level of the received reflected wave received by the first antenna, and the amplitude level of the received reflected wave received by the second antenna. (A) If the difference value between the amplitude levels is equal to or larger than a predetermined difference threshold value, the reflected wave type estimation section determines that the received reflected wave is a composite reflected wave. (B) If the difference value between the amplitude levels is smaller than the predetermined difference threshold value, the reflected wave type estimation section determines that the received reflected wave is a single reflected wave.

In the ninth aspect based on the eighth aspect, the radar apparatus further includes: a distance calculation section configured to calculate a distance to the object, based on the information about the received reflected wave detected by the first antenna; and an amplitude level threshold value calculation section configured to calculate an amplitude level threshold value in accordance with the distance of the object. (C) If the difference value between the amplitude levels is smaller than the predetermined difference threshold value and if the amplitude level of the received reflected wave detected by the first antenna is smaller than the amplitude level threshold value, the reflected wave type estimation section determines that the received reflected wave is a single reflected wave. (D) If the difference value between the amplitude levels is smaller than the predetermined difference threshold value and if the amplitude level of the received reflected wave detected by the first antenna is equal to or larger than the amplitude level threshold value, the reflected wave type estimation section determines that the received reflected wave is a composite reflected wave.

Advantageous Effects of the Invention

According to the first aspect, it is possible to estimate the type of the received reflected wave received by an antenna. Specifically, the radar apparatus which transmits and receives an electromagnetic wave to detect an object can estimate which the received reflected wave is, a single reflected wave which is just reflected from an object, or a composite reflected wave which is composed of a plurality of reflected waves that have arrived through different propagation routes and have interfered with each other. Therefore, it becomes possible to change the calculation method of the position of an object or to change data to be outputted from the radar apparatus, in accordance with the type of a received reflected wave.

According to the second aspect, it is possible to estimate the type of the received reflected wave received by an antenna, and to change the method for calculating the presence direction of an object, in accordance with the type of the received reflected wave. Therefore, the presence direction of an object can be calculated accurately and efficiently.

According to the third aspect, it is possible to estimate the type of the received reflected wave, with a simple configuration.

According to the fourth aspect, it is possible to accurately estimate which the received reflected wave received by each antenna is, a single reflected wave or a composite reflected wave which is composed of reflected waves that have arrived through propagation routes different with respect to the horizontal direction as seen from the radar apparatus.

According to the fifth aspect, it is possible to accurately estimate which the received reflected wave received by each antenna is, a single reflected wave or a composite reflected wave which is composed of reflected waves that have arrived through propagation routes different with respect to the vertical direction as seen from the radar apparatus.

According to the sixth aspect, if the received reflected wave is a composite reflected wave, it is possible to calculate the arrival directions of a plurality of reflected waves composing the composite reflected wave, thereby accurately estimating the presence direction of an object causing the reflected waves.

According to the seventh aspect, if the received reflected wave is a single reflected wave, the presence direction of an object is calculated by phase monopulse technique. Therefore, it becomes possible to calculate the presence direction of an object more easily and with small processing amount than in the case of conducting the calculation by maximum likelihood estimation.

According to the eighth aspect, it is possible to estimate the type of the received reflected wave by a simple process using a threshold value.

According to the ninth aspect, in the situation where reflected waves are caused from a plurality of objects and the reflected wave from one object is very strong relative to the reflected wave from another object, that is, in the situation where, even if the reflected wave received by each antenna is a composite reflected wave, the reflected wave is likely to be estimated as a single reflected wave, the reflected wave can be correctly estimated as a composite reflected wave. Therefore, for example, even in the case where a trailer or the like which is relatively easy to reflect an electromagnetic wave is present near a person which is relatively difficult to reflect an electromagnetic wave, it is possible to detect the person without failing to detect the person.

BRIEF DESCRIPTION OF THE DRAWINGS

FIG. 4 shows the definitions of the angle $\phi$ and the angle $\theta$ which indicate the arrival direction of a reflected wave.

DESCRIPTION OF EMBODIMENTS

Hereinafter, a radar apparatus 1 according to an embodiment of the present invention will be described. Hereinafter, as an example, it will be assumed that a vehicle is provided with the radar apparatus 1 and is used for detecting an object around the vehicle.

Figure 1:
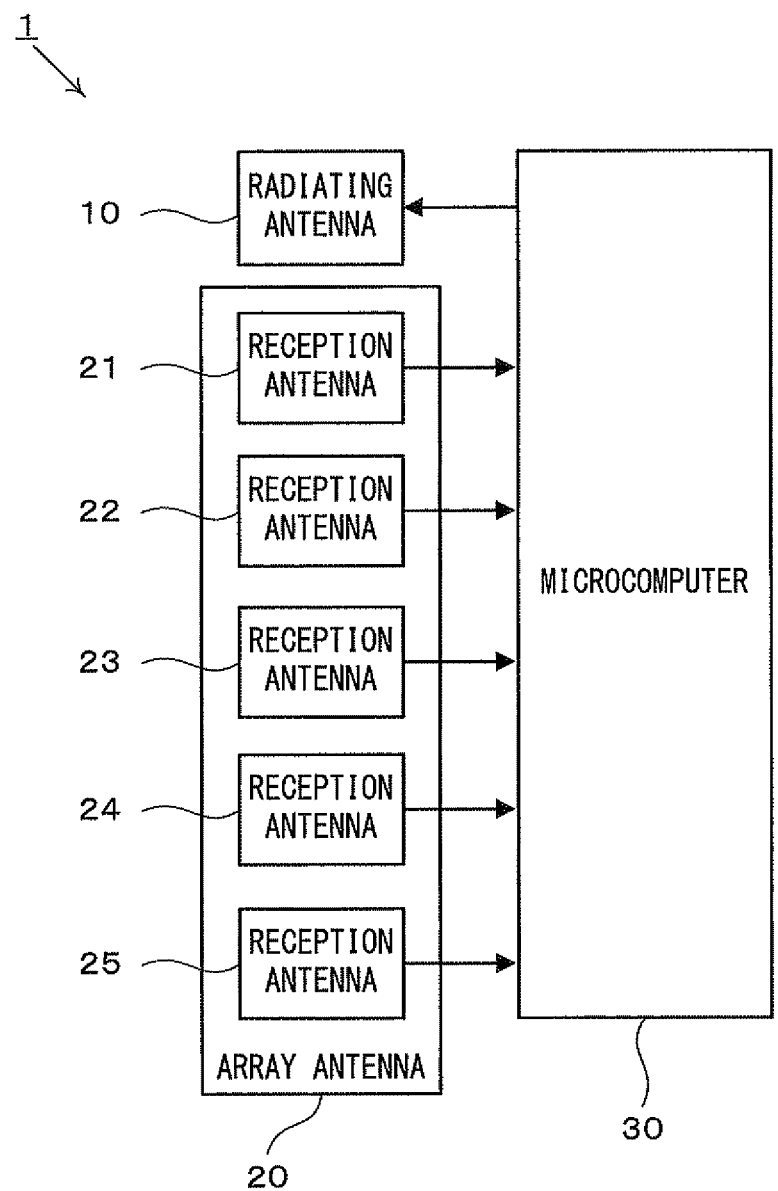
FIG. 1 is a block diagram showing an example of the configuration of a radar apparatus 1.

First, with reference to FIG. 1, the configuration of the radar apparatus 1 will be described. It is noted that FIG. 1 is a block diagram showing an example of the configuration of the radar apparatus 1. As shown in FIG. 1, the radar apparatus 1 includes a radiating antenna 10, an array antenna 20, and a microcomputer 30.

The radiating antenna 10 is an antenna apparatus which radiates an electromagnetic wave to the space around the vehicle. The radiating antenna 10 radiates an electromagnetic wave to the space around the vehicle, at predetermined time intervals. The electromagnetic wave radiated by the radiating antenna 10 has a millimeter wavelength, for example. Hereinafter, as an example, it will be assumed that the radiating antenna 10 radiates an electromagnetic wave having a wavelength of $\lambda$.

The array antenna 20 is an antenna apparatus which receives an electromagnetic wave radiated by the radiating antenna 10. The array antenna 20 includes a plurality of reception antennas 21 to 25. The reception antennas 21 to 25 are antenna devices which detect information about a reflected wave which is received by each of the reception antennas 21 to 25. The reception antennas 21 to 25 each detect the amplitude, the phase, and the frequency of a reflected wave. The reception antennas 21 to 25 each transmit data indicating the amplitude, the phase, and the frequency that have been detected, to the microcomputer 30. Hereinafter, a reflected wave actually received by each reception antenna is referred to as a received reflected wave.

The microcomputer 30 is an information processing apparatus that includes a storage device such as a memory, and an interface circuit. The microcomputer 30 estimates which the type of a received reflected wave is, a single reflected wave which is just reflected from an object, or a composite reflected wave which is composed of reflected waves from different objects that have interfered with each other, based on information about the received reflected wave inputted from each reception antenna. The microcomputer 30 calculates the arrival direction of the reflected wave, that is, the direction in which an object is present, by using a calculation method corresponding to the type of the received reflected wave. The microcomputer 30 is connected to another apparatus such as an ECU of the vehicle, and outputs data indicating the detected presence direction of the object to the other apparatus. It is noted that the details of a process executed by the microcomputer 30 will be described later.

Figure 2:
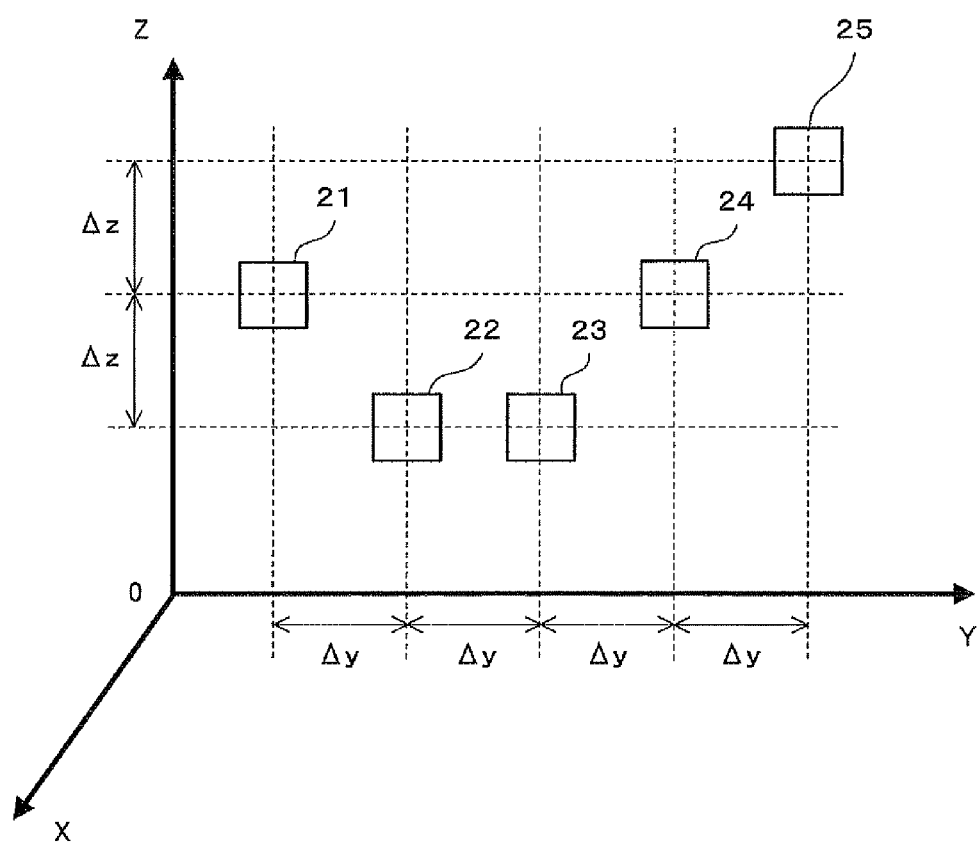
FIG. 2 is a placement diagram showing an example of the array of reception antennas.

FIG. 2 is a placement diagram showing an example of the array of the reception antennas. Hereinafter, the positional relationship among the reception antennas 21 to 25 placed in an XYZ coordinate system will be described with reference to FIG. 2. In FIG. 2, the XY plane represents a horizontal plane, and the Z axis represents a vertical direction. As shown in FIG. 2, the reception antennas 21 to 25 are placed such that the reception surfaces thereof are present on the YX plane. That is, the X coordinates of the reception antennas 21 to 25 are the same. The reception antennas 21 to 25 are arrayed, along the Y axis, in the order, the reception antenna 21, the reception antenna 22, the reception antenna 23, the reception antenna 24, and then the reception antenna 25, with intervals of $\Delta y$ therebetween. The reception antenna 22 and the reception antenna 23 are placed at the same arbitrary Z coordinate. The Z coordinates of the reception antenna 21 and the reception antenna 24 are greater (higher) than those of the reception antenna 22 and the reception antenna 23 by $\Delta z$. The Z coordinate of the reception antenna 25 is greater (higher) than those of the reception antenna 21 and the reception antenna 24 by $\Delta z$. Here, it is preferable that each of $\Delta y$ and $\Delta z$ is equal to or smaller than $\frac{1}{2}$ of the wavelength of the electromagnetic wave transmitted from the radiating antenna 10.

Owing to the above placement of the reception antennas, it is possible to estimate which a received reflected wave is, a composite reflected wave or a single reflected wave, by comparing the amplitude levels of the received reflected waves detected by the reception antennas. Hereinafter, the principle will be described.

For example, it will be assumed that a received reflected wave C is a composite reflected wave composed of a wave A and a wave B having different phases. The wave A and the wave B increase or decrease each other's amplitude levels at points where the wave A and the wave B have different phases. Here, if a plurality of reception antennas are placed in advance at different positions as described above, the reception antennas receive reflected waves having different phases. At this time, if the received reflected waves are composite reflected waves, their amplitude levels detected by the reception antennas are different from each other. On the other hand, if reflected waves are single reflected waves, the reflected waves are received at a constant amplitude level by the reception antennas irrespective of the positions of the reception antennas. Therefore, by placing the reception antennas as shown in FIG. 2, it is possible to estimate that a received reflected wave is a composite reflected wave if the difference between the amplitude levels of received reflected waves detected by the reception antennas is relatively large, and that a received reflected wave is a single reflected wave if the difference between the amplitude levels of received reflected waves detected by the reception antennas is relatively small.

Figure 3:
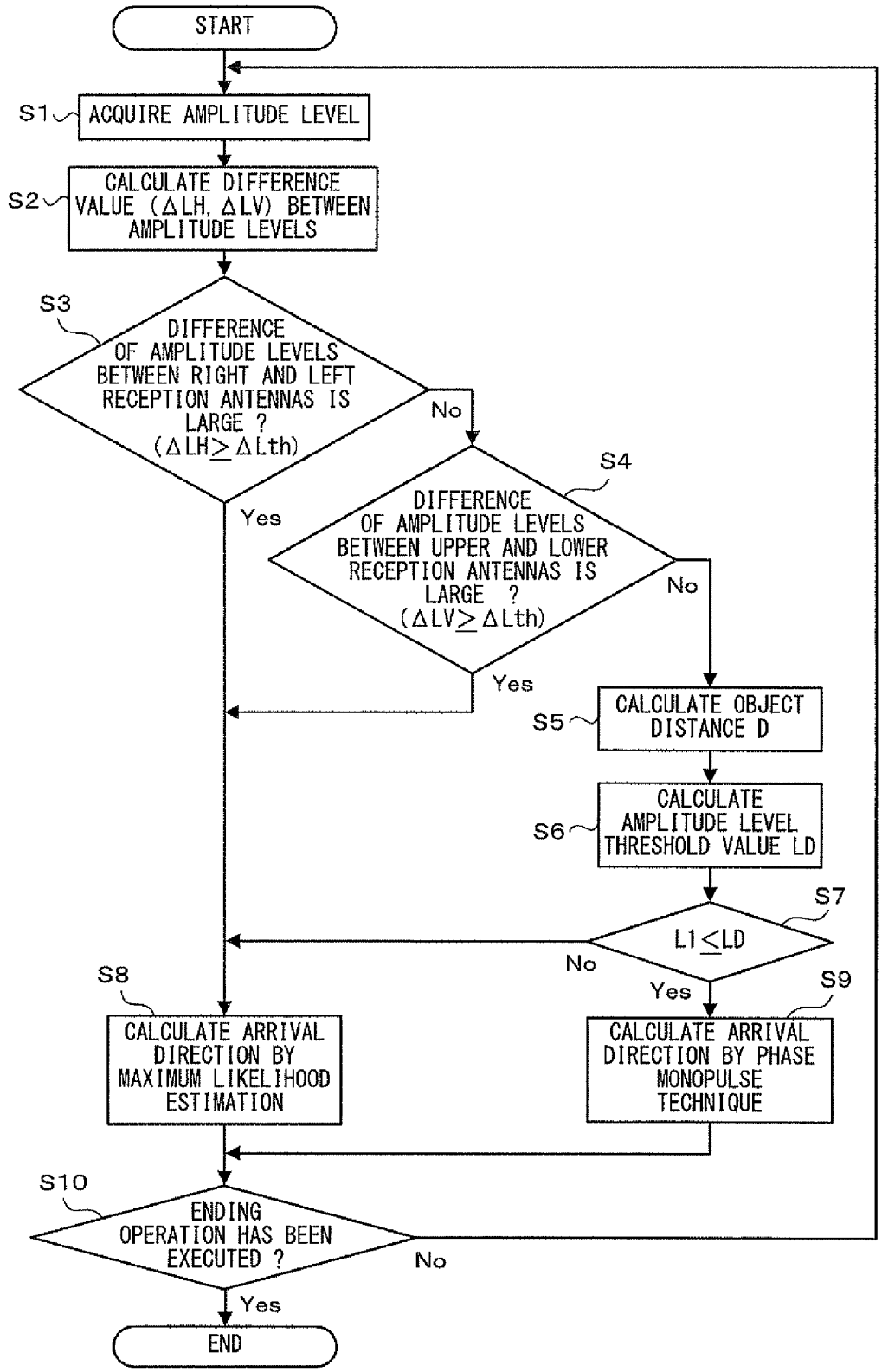
FIG. 3 is a flowchart showing an example of a process executed by a microcomputer 30.

Next, with reference to FIG. 3, a process executed by the microcomputer 30 will be described. FIG. 3 is a flowchart showing an example of the process executed by the microcomputer 30. The microcomputer 30 executes the process shown in FIG. 3 when an ignition switch of the vehicle having the radar apparatus 1 is turned on. When the process shown in FIG. 3 is started, first, the microcomputer 30 executes processing of step S1.

In step S1, the microcomputer 30 acquires the amplitude levels detected by the reception antennas. Hereinafter, the amplitude level detected by the reception antenna 21 is denoted by L1, the amplitude level detected by the reception antenna 22 is denoted by L2, the amplitude level detected by the reception antenna 23 is denoted by L3, the amplitude level detected by the reception antenna 24 is denoted by L4, and the amplitude level detected by the reception antenna 25 is denoted by L5. If the microcomputer 30 has completed processing of step S1, the process proceeds to step S2.

In step S2, the microcomputer 30 calculates the difference values between the amplitude levels detected by the reception antennas. Specifically, first, the microcomputer 30 calculates a difference value $\Delta LH$ between the amplitude levels detected by any two, of the reception antennas, that are placed at positions having the same Z coordinate and different Y coordinates. For example, the microcomputer 30 calculates the difference value $\Delta LH$ between the amplitude level L2 detected by the reception antenna 22 and the amplitude level L3 detected by the reception antenna 23, based on expression (1).

[Expression 1]

$$\Delta LH = L3 - L2 \tag{1}$$

Next, the microcomputer 30 calculates a difference value $\Delta LV$ between the amplitude levels detected by any two, of the reception antennas, that are placed at positions having different Z coordinates. For example, the microcomputer 30 calculates the difference value ΔLV between the amplitude level L21 detected by the reception antenna 21 and the amplitude level L2 detected by the reception antenna 22, based on expression (2).

[Expression 2]

$$\Delta LV = L2 - L1 \qquad (2)$$

It is noted that in step S2, the microcomputer 30 may execute the calculations of ΔLH and ΔLV in any order. If the microcomputer 30 has completed processing of step S2, the process proceeds to step S3.

In step S3, the microcomputer 30 determines whether or not the difference of the amplitude level between right and left reception antennas is relatively large. Specifically, the microcomputer 30 determines whether or not the difference value ΔLH is equal to or larger than a difference threshold value ΔLth. The difference threshold value ΔLth is a first threshold value for determining the type of a received reflected wave. In addition, the difference threshold value ΔLth is a constant value and stored in advance in the storage device. If the difference value ΔLH is equal to or larger than the difference threshold value ΔLth, the microcomputer 30 determines that the difference of the amplitude levels between right and left reception antennas is relatively large, and the process proceeds to step S8. On the other hand, if the difference value ΔLH is smaller than the difference threshold value ΔLth, the microcomputer 30 determines that the difference of the amplitude levels between right and left reception antennas is relatively small, and the process proceeds to step S4.

According to step S3, it is possible to estimate whether or not a received reflected wave is a composite reflected wave composed of a plurality of reflected waves that have arrived through propagation routes different with respect to the horizontal direction (XY plane components) (hereinafter, such a composite reflected wave is referred to as a horizontal composite wave). Specifically, if the difference of the amplitude level between right and left reception antennas is large, the microcomputer 30 can estimate that a received reflected wave is a horizontal composite wave. On the other hand, if the difference of the amplitude levels between right and left reception antennas is small, the microcomputer 30 can estimate that a received reflected wave is a single reflected wave, or that a received reflected wave is a composite reflected wave composed of a plurality of reflected waves whose propagation directions are the same at least with respect to horizontal directions (XY plane components). It is noted that it can be considered that such a composite reflected wave composed of a plurality of reflected waves whose propagation directions are the same at least with respect to horizontal directions (XY plane components) is a composite reflected wave composed of a plurality of reflected waves that have arrived through propagation routes that are different with respect to the vertical direction (XZ plane components) (hereinafter, such a composite reflected wave is referred to as a vertical composite wave).

In step S4, the microcomputer 30 determines whether or not the difference of the amplitude level between upper and lower reception antennas is relatively large. Specifically, the microcomputer 30 determines whether or not the difference value ΔLV is equal to or larger than the difference threshold value ΔLth. If the difference value ΔLV is equal to or larger than the difference threshold value ΔLth, the microcomputer 30 determines that the difference of the amplitude levels between upper and lower reception antennas is large, and the process proceeds to step S8. On the other hand, if the difference value ΔLV is smaller than the difference threshold value ΔLth, the microcomputer 30 determines that the difference of the amplitude level between upper and lower reception antennas is small, and the process proceeds to step S5.

According to step S4, it is possible to estimate whether or not a received reflected wave is a vertical composite wave. Specifically, if the difference of the amplitude levels between upper and lower reception antennas is large, the microcomputer 30 can estimate that a received reflected wave is a vertical composite wave. On the other hand, if the difference of the amplitude levels between upper and lower reception antennas is small, the microcomputer 30 can estimate that a received reflected wave is a single reflected wave because it does not correspond to either a horizontal composite wave or a vertical composite wave.

Thus, according to steps S1 to S4, it is possible to estimate the type of a received reflected wave by comparing the amplitude levels detected by the reception antennas.

In step S5, the microcomputer 30 calculates an object distance D. The object distance D is the distance to an object causing a received reflected wave. It is noted that a conventional known method may be used for the calculation of the object distance D. For example, the microcomputer 30 calculates the object distance D, based on the variation in frequency between a received reflected wave detected by any of the reception antennas, and an electromagnetic wave radiated by the radiating antenna 10. Typically, the microcomputer 30 calculates the distance to an object by using FM-CW technique. If the microcomputer 30 has completed processing of step S5, the process proceeds to step S6.

In step S6, the microcomputer 30 calculates an amplitude level threshold value LD. The amplitude level threshold value LD is a second threshold value for determining the type of a received reflected wave. The amplitude level threshold value LD is a variable that varies in accordance with the value of the object distance D.

More specifically, the amplitude level threshold value LD may be a variable determined in accordance with the amplitude level of a received reflected wave that is supposed to be detected in the case where each reception antenna receives a reflected wave from a person present at a position separated from the radar apparatus 1 by the object distance D. For example, the microcomputer 30 stores in advance a data table indicating the correspondence relationship between the value of the object distance D and the amplitude level threshold value LD. The microcomputer 30 reads the amplitude level threshold value LD corresponding to the value of the object distance D calculated in step S5, from the data table. Here, the values of the amplitude level threshold value LD corresponding to the respective values of the object distance D in the data table may be determined in advance through experiments or the like. That is, while a person is actually made to stand at predetermined distances from the radar apparatus 1, and the intensity of a received reflected wave is measured, the values of the amplitude level threshold value LD corresponding to the respective values of the object distance D may be set in the data table. Here, the values of the amplitude level threshold value LD may be a value obtained by adding a predetermined constant value to the actually detected values of the amplitude levels of received reflected waves. It is noted that in general, the amplitude level attenuates as the propagation distance increases. Therefore, the longer the object distance D is, the smaller the amplitude level threshold value LD is.

It is noted that the above-described method of calculation of the amplitude level threshold value LD is merely an example. The microcomputer 30 may use a conventional known technique to calculate the amplitude level threshold value LD. If the microcomputer 30 has completed processing of step S6, the process proceeds to step S7.

In step S7, the microcomputer 30 determines whether or not the amplitude level L1 is equal to or smaller than the amplitude level threshold value LD. If the microcomputer 30 has determined that the amplitude level L1 is equal to or smaller than the amplitude level threshold value LD, the process proceeds to step S9. On the other hand, if the microcomputer 30 has determined that the amplitude level L1 is larger than the amplitude level threshold value LD, the process proceeds to step S8.

According to steps S5 to S7, even if the difference between the amplitude levels detected by the reception antennas is small, the microcomputer 30 can estimate, in the situation where there is a high possibility of failing to detect a person, that a received reflected wave is a composite reflected wave.

For example, it will be assumed that a trailer or the like which is relatively easy to reflect an electromagnetic wave is present near a person which is relatively difficult to reflect an electromagnetic wave. In such a case, even if a reflected wave from a person interferes with a reflected wave from a trailer to cause a composite reflected wave, the influence of the person's reflected wave on the amplitude level of the trailer's reflected wave is small. Therefore, there is a possibility that the difference value between the amplitude levels detected by the reception antennas will become small even though composite reflected waves have been received by the reception antennas. According to steps S5 to S7, in such a situation, the microcomputer 30 estimates that a received reflected wave is a composite reflected wave thereby determining that reflected waves from a plurality of objects have occurred and preventing a person from not being recognized.

In step S8, the microcomputer 30 calculates the arrival direction of a received reflected wave by using a maximum likelihood estimation. A method of calculation of the arrival directions of a plurality of reflected waves by using the maximum likelihood estimation is a conventional known technique. An example of the calculation method will be shown below.

First, the microcomputer 30 reads a theoretical expression, of a received reflected wave to be received by each reception antenna, which is stored in advance in the storage device, and sequentially substitutes possible values in each parameter of the theoretical expression.

In the case where a composite reflected wave composed of two reflected waves W1 and W2 arrive as a received reflected wave, the theoretical expressions of the received reflected waves received by the reception antennas are represented by expressions (3) to (7), respectively. Here, E1 in expression (3) indicates a signal of the received reflected wave received by the reception antenna 21. E2 in expression (4) indicates a signal of the received reflected wave received by the reception antenna 22. E3 in expression (5) indicates a signal of the received reflected wave received by the reception antenna 23. E4 in expression (6) indicates a signal of the received reflected wave received by the reception antenna 24. E5 in expression (7) indicates a signal of the received reflected wave received by the reception antenna 25.

[Expression 3]

$$E1 = A_1 \exp\left[j\frac{2\pi}{\lambda}\Delta z \sin\theta_1\right] + A_2 \exp\left[j\frac{2\pi}{\lambda}\Delta z \sin\theta_2\right] \quad (3)$$

[Expression 4]

$$E2 = A_1 \exp\left[j\frac{2\pi}{\lambda}\Delta y \cos\theta_1 \sin\phi_1\right] + A_2 \exp\left[j\frac{2\pi}{\lambda}\Delta y \cos\theta_2 \sin\phi_2\right] \quad (4)$$

[Expression 5]

$$E3 = A_1 \exp\left[j\frac{4\pi}{\lambda}\Delta y \cos\theta_1 \sin\phi_1\right] + A_2 \exp\left[j\frac{4\pi}{\lambda}\Delta y \cos\theta_2 \sin\phi_2\right] \quad (5)$$

[Expression 6]

$$E4 = A_1 \exp\left[j\frac{2\pi}{\lambda}\{3\Delta y \cos\theta_1 \sin\phi_1 + \Delta z \cos\theta_1\}\right] + \\ A_2 \exp\left[j\frac{2\pi}{\lambda}\{3\Delta y \cos\theta_2 \sin\phi_2 + \Delta z \cos\theta_2\}\right] \quad (6)$$

[Expression 7]

$$E5 = A_1 \exp\left[j\frac{2\pi}{\lambda}\{4\Delta y \cos\theta_1 \sin\phi_1 + 2\Delta z \cos\theta_1\}\right] + \\ A_2 \exp\left[j\frac{2\pi}{\lambda}\{4\Delta y \cos\theta_2 \sin\phi_2 + 2\Delta z \cos\theta_2\}\right] \quad (7)$$

It is noted that in the above expressions (3) to (7), A indicates the amplitude of each reflected wave, and $\phi$ and $\theta$ are parameters indicating the arrival direction of each reflected wave. In the above expressions, the parameters for the reflected wave W1 are marked by 1 as index, and the parameters for the reflected wave W2 are marked by 2 as index, thus indicating the correspondence relationship between each reflected wave and parameters.

Hereinafter, the definitions of the angle $\phi$ and the angle $\theta$ will be described with reference to FIG. 4. FIG. 4 shows the definitions of the angle $\phi$ and the angle $\theta$ which indicate the arrival direction of each reflected wave. The coordinate system in FIG. 4 is similar to that in FIG. 2. In FIG. 4, a vector R indicates the arrival direction of a reflected wave. The angle $\phi$ is the angle formed by the vector R and the XZ plane. The angle $\theta$ is the angle formed by the vector R and the XY plane.

The microcomputer 30 compares the values calculated by sequentially substituting, in the parameters in each theoretical expression, values that the parameters can take, with an actual signal value received by each reception antenna. The microcomputer 30 determines, as the arrival direction of the reflected wave, a combination of the angle $\theta$ and the angle $\phi$ that minimizes the difference between the calculated value and the actual signal value. After determining such angle $\phi$ and angle $\theta$, the microcomputer 30 outputs data indicating the angle $\phi$ and the angle $\theta$ to the other device such as the ECU of the vehicle. If the microcomputer 30 has completed processing of step S8, the process proceeds to step S10.

According to step S8 described above, if it is estimated that a received reflected wave is a composite reflected wave, the microcomputer 30 calculates the arrival direction of each reflected wave by using the maximum likelihood estimation. Thus, while calculating the arrival directions of a plurality of reflected waves composing a composite reflected wave, the microcomputer 30 can accurately calculate the presence directions of objects causing the reflected waves.

In step S9, the microcomputer 30 calculates the arrival direction of a reflected wave by using phase monopulse technique. A method of calculation of the arrival direction of a single reflected wave by using the phase monopulse technique is a conventional known technique. An example of the calculation method will be shown below.

First, the microcomputer 30 acquires the phases of received reflected waves detected by the reception antennas.

The microcomputer 30 calculates a phase difference $\Delta\psi1$ between the reception antenna 22 and the reception antenna 21, and a phase difference $\Delta\psi2$ between the reception antenna 23 and the reception antenna 24.

Here, the phase difference $\Delta\psi1$ and the phase difference $\Delta\psi2$ are represented by expression (8) and expression (9), respectively.

[Expression 8]

$$\Delta\psi1 = \frac{2\pi}{\lambda}[-\Delta y\cos\theta\sin\phi + \Delta z\sin\theta] \quad (8)$$

[Expression 9]

$$\Delta\psi2 = \frac{2\pi}{\lambda}[\Delta y\cos\theta\sin\phi + \Delta z\sin\theta] \quad (9)$$

That is, the angle $\theta$ and the angle $\phi$ are represented by expression (10) and expression (11) using the phase difference $\Delta\psi1$ and the phase difference $\Delta\psi2$, respectively.

[Expression 10]

$$\theta = \arcsin\left[\frac{\lambda}{4\pi\Delta z}(\Delta\psi1 + \Delta\psi2)\right] \quad (10)$$

[Expression 11]

$$\phi = \arcsin\left[\frac{\lambda}{4\pi\Delta y\cos\theta}(\Delta\psi2 - \Delta\psi1)\right] \quad (11)$$

The microcomputer 30 substitutes the calculated values of the phase difference $\Delta\psi1$ and the phase difference $\Delta\psi2$, in expression (10) and expression (11) stored in advance in the storage device, thereby calculating the angle $\phi$ and the angle $\theta$. The microcomputer 30 outputs data indicating the angle $\phi$ and the angle $\theta$ to the other device such as the ECU of the vehicle. If the microcomputer 30 has completed processing of step S9, the process proceeds to step S10.

According to step S9, if it is estimated that a received reflected wave is a single reflected wave, the microcomputer 30 calculates the arrival direction of the reflected wave by using the phase monopulse technique. In general, in the case of using the phase monopulse technique, the processing amount is smaller than in the case of using the maximum likelihood estimation. Therefore, if a received reflected wave is a single reflected wave, the microcomputer 30 can calculate the presence direction of an object causing the reflected wave, easily and with relatively small processing amount.

In step S10, the microcomputer 30 determines whether or not an ending operation has been executed. Specifically, for example, the microcomputer 30 determines whether or not an IG power supply of the vehicle having the radar apparatus 1 has been turned off. If the microcomputer 30 has determined that the ending operation has been executed, the microcomputer 30 finishes the process shown in FIG. 3. On the other hand, if the microcomputer 30 has determined that the ending operation has not been executed, the process returns to step S1 to repeat the above-described steps.

As described above, according to the process by the microcomputer 30, the microcomputer 30 can estimate the type of a received reflected wave, and calculate the arrival direction of the reflected wave by using the maximum likelihood estimation or the phase monopulse technique in accordance with the type of the received reflected wave. That is, the radar apparatus 1 according to the present embodiment can estimate the type of a received reflected wave, and accurately calculate the presence direction of an object by using a calculation method corresponding to the type of the reflected wave.

In the above embodiment, as an example, the microcomputer 30 changes the calculation method of the arrival direction of a reflected wave in accordance with the type of a received reflected wave. However, as long as the type of a received reflected wave can be determined, the microcomputer 30 may execute another process in accordance with the result of the determination. For example, if the microcomputer 30 has determined that a received reflected wave is a composite reflected wave, the microcomputer 30 may treat an object causing the received reflected wave as not being detected, without calculating the arrival direction. That is, the microcomputer 30 may omit step S8. In addition, if the microcomputer 30 has determined that a received reflected wave is a composite reflected wave, when outputting the position information about an object to another computer or the like, the microcomputer 30 may output flag data indicating that the accuracy of the position information is low, together with the data of the position information.

In the above embodiment, as an example, the microcomputer 30 determines whether or not a received reflected wave is a composite reflected wave composed of a plurality of reflected wave propagated through routes that are different with respect to the horizontal direction, based on the difference value between the amplitude levels detected by the reception antenna 22 and the reception antenna 23. However, the microcomputer 30 may perform the determination, based on the difference value between the amplitude levels detected by other reception antennas. Specifically, the microcomputer 30 may select any two, of the reception antennas, that are placed at positions having the same Z coordinate and different Y coordinates. For example, the difference value between the amplitude level L1 detected by the reception antenna 21 and the amplitude level L4 detected by the reception antenna 24 may be used as $\Delta LH$. It is noted that it is preferable that the distance between the two reception antennas selected in the process is equal to or shorter than $\lambda/2$.

In the above embodiment, as an example, five reception antennas are used to determine the type of a reflected wave. However, the number of the reception antennas may be changed in accordance with a component, of the arrival direction of a reflected wave, that is to be detected.

Figure 5:
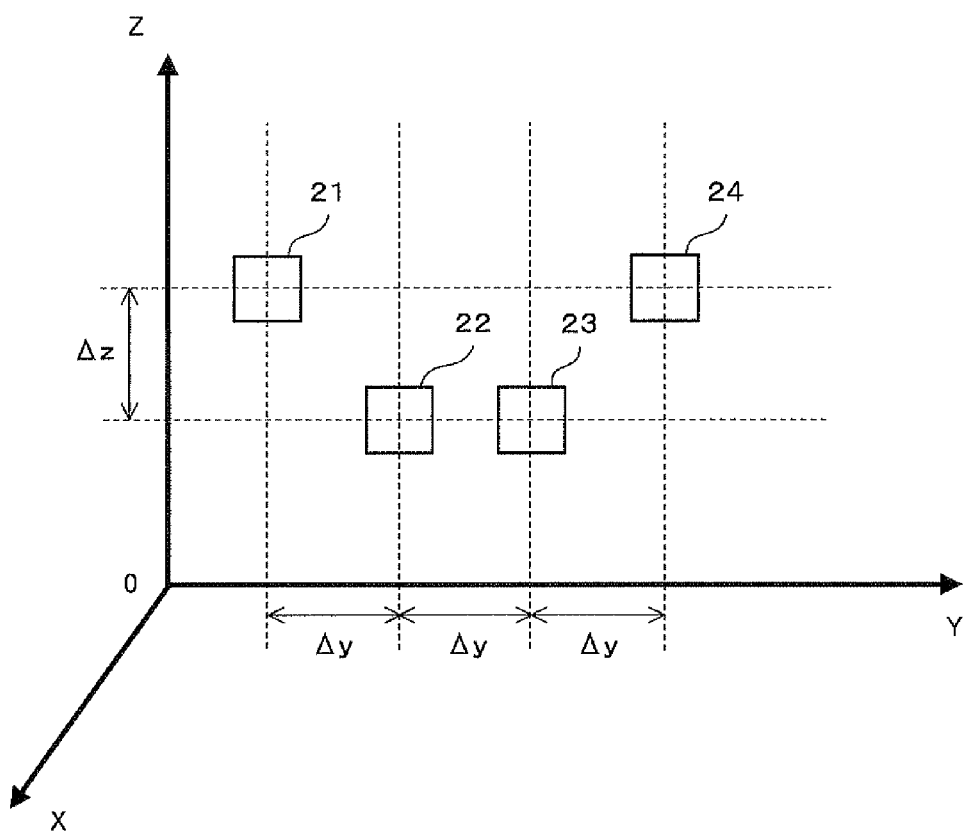
FIG. 5 is a placement diagram showing an example of the array of the reception antennas in the case where a reception antenna 25 is omitted.
Figure 6:
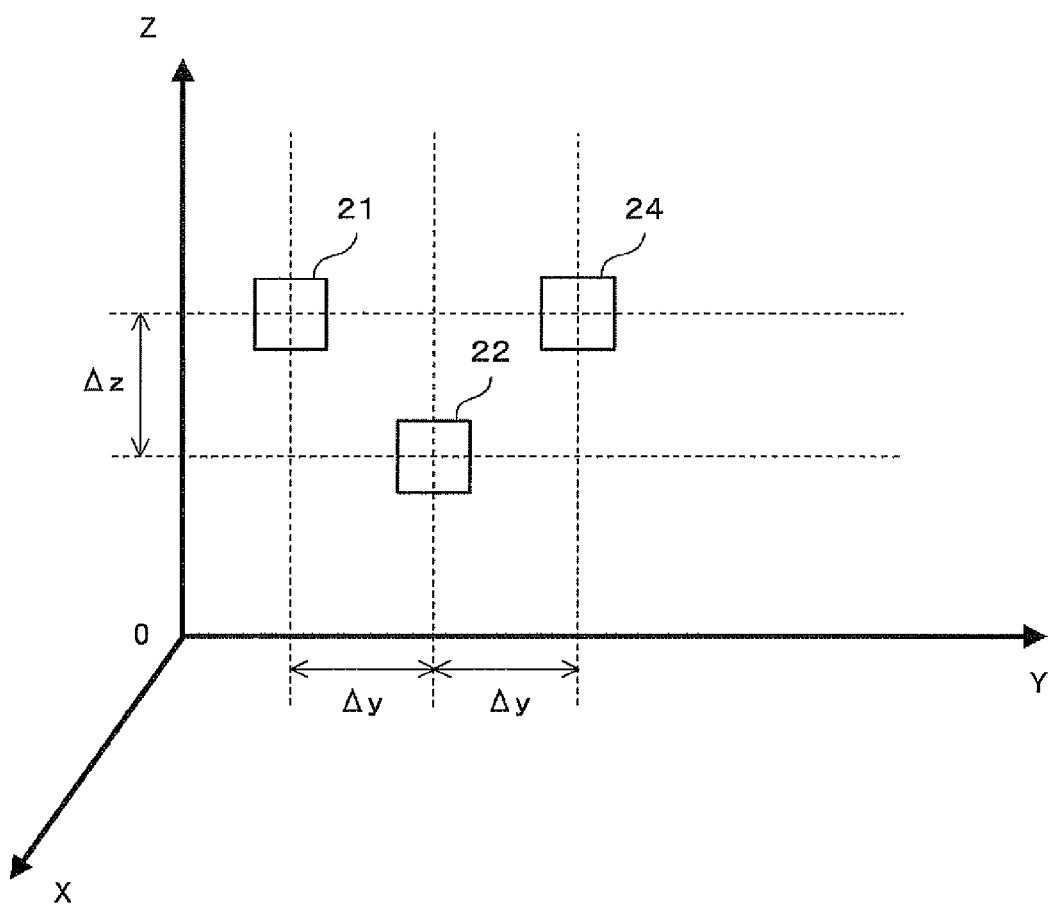
FIG. 6 is a placement diagram showing an example of the array of the reception antennas in the case where a reception antennas 23 and 25 are omitted.

For example, in the case where only a component of the angle cp of the arrival direction of a reflected wave is to be calculated, the reception antenna 25 may be omitted. Specifically, as shown in FIG. 5, the array antenna 20 may be composed of only four reception antennas, i.e., the reception antennas 21 to 24. FIG. 5 is a placement diagram showing an example of the array of the reception antennas in the case where the reception antenna 25 is omitted. Alternatively, in the case where only a component of the angle $\theta$ of the arrival direction of a reflected wave is to be calculated, the reception antenna 23 and the reception antenna 25 may be omitted. Specifically, as shown in FIG. 6, the array antenna 20 may be composed of only three reception antennas, i.e., the reception antennas 21, 22, and 24. FIG. 6 is a placement diagram showing an example of the array of the reception antennas in the case where the reception antennas 23 and 25 are omitted. In the case of using the placement of the reception antennas as shown in FIG. 6, it is preferable that the distance between the reception antenna 22 and the reception antenna 24 with respect to the Y axis direction is $\Delta y$.

In the above embodiment, as an example, the reception antennas are arrayed at regular intervals with respect to the Y axis direction. However, of the reception antennas, ones that have different Z coordinates may be placed so as to have the same Y coordinate. For example, the reception antenna 21 may be placed above the reception antenna 22. However, in general, it is assumed that each reception antenna device has a shape elongated in the Z direction, or a wire extends downward from each antenna. In such a case, it is effective that the reception antennas are arrayed at regular intervals with respect to the Y axis direction as shown in FIG. 2.

In the above embodiment, as an example, the microcomputer 30 determines whether or not the difference between the amplitude levels of the reception antennas is relatively large, based on the difference value. However, the microcomputer 30 may determine whether or not the difference between the amplitude levels of the reception antennas is relatively large, based on a parameter other than the difference value. For example, the microcomputer 30 may calculate a fraction by dividing the amplitude level of one reception antenna by the amplitude level of another reception antenna. Then, the microcomputer 30 may determine whether or not the difference between the amplitude levels of the reception antennas is relatively large, based on the fraction.

INDUSTRIAL APPLICABILITY

The radar apparatus according to the present invention is effectively applicable to a radar apparatus capable of estimating which a received reflected wave is, a single reflected wave which is just reflected from an object, or a composite reflected wave which is composed of a plurality of reflected waves that have arrived through different propagation routes and have interfered with each other.

DESCRIPTION OF THE REFERENCE CHARACTERS

| | |
|---|---|
| 1 | radar apparatus |
| 10 | radiating antenna |
| 20 | array antenna |
| 21, 22, 23, 24, 25 | reception antenna |
| 30 | microcomputer |

The invention claimed is:

1. A radar apparatus which radiates an electromagnetic wave, receives a reflected wave caused by the electromagnetic wave reflected from an object, and detects the presence direction in which the object is present, the radar apparatus comprising:
  an electromagnetic wave radiating section configured to radiate the electromagnetic wave;
  a reflected wave reception section configured to receive the reflected wave and detect information about the received reflected wave;
  a reflected wave type estimation section configured to determine which the type of the received reflected wave received by the reflected wave reception section is, a single reflected wave which is just reflected from an object, or a composite reflected wave which is composed of a plurality of reflected waves, reflected from different objects, that have interfered with each other, based on the information about the received reflected wave; and
  a direction calculation section configured to calculate the presence direction of an object, based on the result of the determination by the reflected wave type estimation section, wherein
  the reflected wave reception section includes:
    a first antenna configured to detect at least the amplitude level of the received reflected wave as the information about the received reflected wave; and
    a second antenna which is separately provided at a given position on a plane including the reception surface of the first antenna, the second antenna being configured to detect at least the amplitude level of the received reflected wave as the information about the received reflected wave, and
  the reflected wave type estimation section is configured to determine which the type of the received reflected wave is, a single reflected wave or a composite reflected wave, based on the magnitude relationship between the amplitude level of the received reflected wave detected by the first antenna, and the amplitude level of the received reflected wave detected by the second antenna.

2. The radar apparatus according to claim 1, wherein the direction calculation section changes a method for calculating the presence direction of an object in accordance with the type of the received reflected wave, and calculates the presence direction of the object by the method.

3. The radar apparatus according to claim 1, wherein the second antenna is placed being separated from the first antenna by a predetermined distance in the horizontal direction, on the plane including the reception surface of the first antenna.

4. The radar apparatus according to claim 1, wherein the second antenna is placed being displaced relative to the first antenna by a predetermined distance in the vertical direction, on the plane including the reception surface of the first antenna.

5. The radar apparatus according to claim 1, wherein if it has been determined that the type of the received reflected wave is a composite reflected wave, the direction calculation section calculates the presence direction of the object, by maximum likelihood estimation.

6. The radar apparatus according to claim 1, wherein the first antenna and the second antenna each detect the phase of the received reflected wave, and
if it has been determined that the type of the received reflected wave is a single reflected wave, the direction calculation section calculates the presence direction of the object, by phase monopulse technique, based on the phase of the received reflected wave detected by the first antenna, and the phase of the received reflected wave detected by the second antenna.

7. The radar apparatus according to claim 1, wherein the reflected wave type estimation section
calculates the difference value between the amplitude level of the received reflected wave received by the first antenna, and the amplitude level of the received reflected wave received by the second antenna,
(A) if the difference value between the amplitude levels is equal to or larger than a predetermined difference threshold value, determines that the received reflected wave is a composite reflected wave, and
(B) if the difference value between the amplitude levels is smaller than the predetermined difference threshold value, determines that the received reflected wave is a single reflected wave.

8. The radar apparatus according to claim 7, further comprising:

a distance calculation section configured to calculate a distance to the object, based on the information about the received reflected wave detected by the first antenna; and an amplitude level threshold value calculation section configured to calculate an amplitude level threshold value in accordance with the distance of the object, wherein the reflected wave type estimation section (C) if the difference value between the amplitude levels is smaller than the predetermined difference threshold value and if the amplitude level of the received reflected wave detected by the first antenna is smaller than the amplitude level threshold value, determines that the received reflected wave is a single reflected wave, and (D) if the difference value between the amplitude levels is smaller than the predetermined difference threshold value and if the amplitude level of the received reflected wave detected by the first antenna is equal to or larger than the amplitude level threshold value, determines that the received reflected wave is a composite reflected wave.

* * * * *